United States Patent
Lee et al.

(10) Patent No.: US 8,234,096 B2
(45) Date of Patent: Jul. 31, 2012

(54) EXTRACTION OF COMPONENT MODELS FROM PCB CHANNEL SCATTERING PARAMETER DATA BY STOCHASTIC OPTIMIZATION

(75) Inventors: Juyoung Lee, Cupertino, CA (US); Drew G. Doblar, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 392 days.

(21) Appl. No.: 12/608,364

(22) Filed: Oct. 29, 2009

(65) Prior Publication Data

US 2011/0107292 A1  May 5, 2011

(51) Int. Cl.
*H04B 15/00* (2006.01)
*G01R 27/00* (2006.01)
*G01R 27/28* (2006.01)
*G01R 27/04* (2006.01)

(52) U.S. Cl. ........... 702/189; 702/65; 702/117; 702/196
(58) Field of Classification Search .................... 702/65, 702/57, 109, 117, 189, 196; 370/252, 203

See application file for complete search history.

(56) References Cited

U.S. PATENT DOCUMENTS

2006/0056310 A1  3/2006  Daniel
2007/0073499 A1  3/2007  Sawyer et al.

*Primary Examiner* — Michael Nghiem
*Assistant Examiner* — Ricky Ngon
(74) *Attorney, Agent, or Firm* — Marsh Fischmann & Breyfogle, LLP; Bobby Soltani; Patrick M. Boucher

(57) ABSTRACT

Various embodiments herein include one or more of systems, methods, software, and/or data structures to extract models of components (e.g., vias and traces) for PCB channels from measurements (or simulations) taken from physical PCB channels. By applying stochastic optimization to measurements of two PCB channels having different channel lengths, s-matrices (e.g., two-port, four-port, and the like) of the components of a PCB channel may be accurately determined by searching the multi-dimensional parameter space for parameters that comply with the measured values. Once the models for the components have been accurately determined, they may be utilized in constructing a model library that includes component models and is based on physical measurement data.

17 Claims, 6 Drawing Sheets

US 8,234,096 B2

EXTRACTION OF COMPONENT MODELS FROM PCB CHANNEL SCATTERING PARAMETER DATA BY STOCHASTIC OPTIMIZATION

BACKGROUND

Electronic Design Automation (EDA) is the category of tools (e.g., computer programs) for designing and producing electronic systems ranging from printed circuit boards (PCBs) to integrated circuits. EDA is sometimes referred to as ECAD (electronic computer-aided design) or just CAD. Competitive pressures to produce new generations of products having improved functionality and performance in more efficient ways have motivated the growing importance of EDA. Further, the complexity of simulating certain electrical structures has increased over the past several years. With relatively high signal rates (e.g., 5-10 Gbit/s or more), the desire for complex and accurate models for components in electrical structures grows to ensure that the physical product performs as desired.

One example of an electrical structure that may benefit from accurate and complex models is a serial communications link (e.g., a backplane serial link). EDA models may help designers predict electrical metrics such as loss, reflection, crosstalk, and skew that may affect system operation. Further, designers may wish to have accurate models for the active and passive components of the serial link for design trade-off studies, for system budgeting and margin studies, and for component sensitivity analysis.

Continuing with the serial link example, to provide an accurate model for the serial link, models for the connectors, chips, packages, PCB traces (or "traces"), vias, and other components may be useful. To generate a model of an existing physical channel for a serial link, the channel may be coupled to a vector network analyzer (VNA) that is operative to measure the scattering parameters (or s-parameters) of the channel. Although this technique is useful for generating models of complete channels, it may be desirable in some applications to provide models of one or more components in the channel. As can be appreciated, it may be difficult to measure characteristics of certain components in the serial link channel, such as vias or other devices, due to various reasons including the inability to physically connect probes of a VNA to these components.

SUMMARY

Various embodiments herein include one or more of systems, methods, software, and/or data structures to extract models of components for PCB channels from measurements (or simulations) taken from physical PCB channels. By applying stochastic optimization to measurements of two PCB channels having different channel lengths, s-matrices of the components of a PCB channel may be accurately determined by searching the multi-dimensional parameter space for parameters that comply with the measured (or simulated) values. Once the models for the components have been accurately determined, they may be utilized in constructing a model library for an EDA tool that includes component models and is based on physical measurement data.

According to a first aspect, a computer-implemented method for determining s-parameters of components in a PCB channel is provided. The method may include receiving measured s-parameters for a first PCB channel (e.g., from a vector network analyzer). The first PCB channel may include a first trace having a component (e.g., a via or other device) coupled to each end. The components may be substantially identical to each other such that the first PCB channel is symmetrical about the center of the first trace. Further, the method may include receiving measured s-parameters for a second PCB channel. Similar to the first PCB channel, the second PCB channel may include a second trace having a component coupled to each end. Again, the components may be substantially identical to each other and to the components of the first PCB channel such that the second PCB channel is symmetrical about the center of the second trace. Additionally, the first trace may have a length different from a length of the second trace. The method further includes calculating s-parameters for the first trace, the second trace, and the components using the measured s-parameters for the first and second PCB channels.

According to a second aspect, a computer system that includes a processor and a data storage coupled to the processor is provided. The data storage may store an s-parameter calculation module that is operative to be executed by the processor to receive measured s-parameters for a first PCB channel at a predetermined plurality of frequencies. The first PCB channel may include a first trace having a component coupled to each end. The components may be substantially identical to each other such that the first PCB channel is symmetrical about the center of the first trace. The s-parameter calculation module may further be operative to be executed by the processor to receive measured s-parameters for a second PCB channel at the predetermined plurality of frequencies. Similar to the first PCB channel, the second PCB channel may include a second trace having a component coupled to each end. Again, the components may be substantially identical to each other and to the components of the first PCB channel such that the second PCB channel is symmetrical about the center of the second trace. Additionally, the first trace may have a length different from a length of the second trace. The s-parameter calculation module may further be operative to be executed by the processor to calculate s-parameters for the first trace, the second trace, and the components at the predetermined plurality of frequencies using the measured s-parameters for the first and second PCB channels.

According to a third aspect, a computer readable medium is provided that includes instructions which, when processed by a computer, cause the computer to receive measured s-parameters for a first symmetrical PCB channel comprising a plurality of components at a predetermined plurality of frequencies. The instructions may also cause the computer to receive measured s-parameters for a second symmetrical PCB channel comprising a plurality of components at the predetermined plurality of frequencies. Further, the first symmetrical PCB channel has a length different from a length of the second symmetrical PCB channel. The instructions may also cause the computer to calculate s-parameters for the plurality of components of the first symmetrical PCB channel and the second symmetrical PCB channel at the predetermined plurality of frequencies using the measured s-parameters for the first and second symmetrical PCB channels.

In addition to the exemplary aspects and embodiments described above, further aspects and embodiments will become apparent by reference to the drawings and by study of the following descriptions.

DETAILED DESCRIPTION

Various embodiments herein include one or more of systems, methods, software, and/or data structures to extract EDA models of components for PCB channels from measurements taken from physical PCB channels. By applying stochastic optimization or other methods to actual measurements of two PCB channels having different channel lengths, s-matrices of the components of a PCB channel may be accurately determined by searching the multi-dimensional parameter space for parameters that comply with the measured values. Once the models for the components have been accurately determined, they may be utilized in constructing a model library for an EDA tool that includes component models and is based on physical measurement data.

The components of multi-layer PCB channels such as vias, traces, or other components may be integral in the design and analysis of high bandwidth (e.g., 5-10 Gbit/s or more) serial link channels. In some instances, component models may be prepared by a simulation method (e.g., a field solver and behavior model), and it may be desirable to obtain a correlation between the physical measurements and the simulation models. However, PCB channel components are often not readily accessible as isolated entities to testing equipment such as vector network analyzers (VNAs). Rather, often the only directly observable entity is the entire end-to-end PCB channel, of which s-parameters may be measured using a VNA. The features described herein relate to accurately isolating s-parameters for the components of PCB channels using the measured s-parameters of the entire PCB channels. As can be appreciated, this isolation may simplify the design and analysis of PCB channels by enabling designers to utilize accurate, measurement-based models of individual components (e.g., vias, traces, and the like) that may be reused in numerous design configurations.

Figure 1:
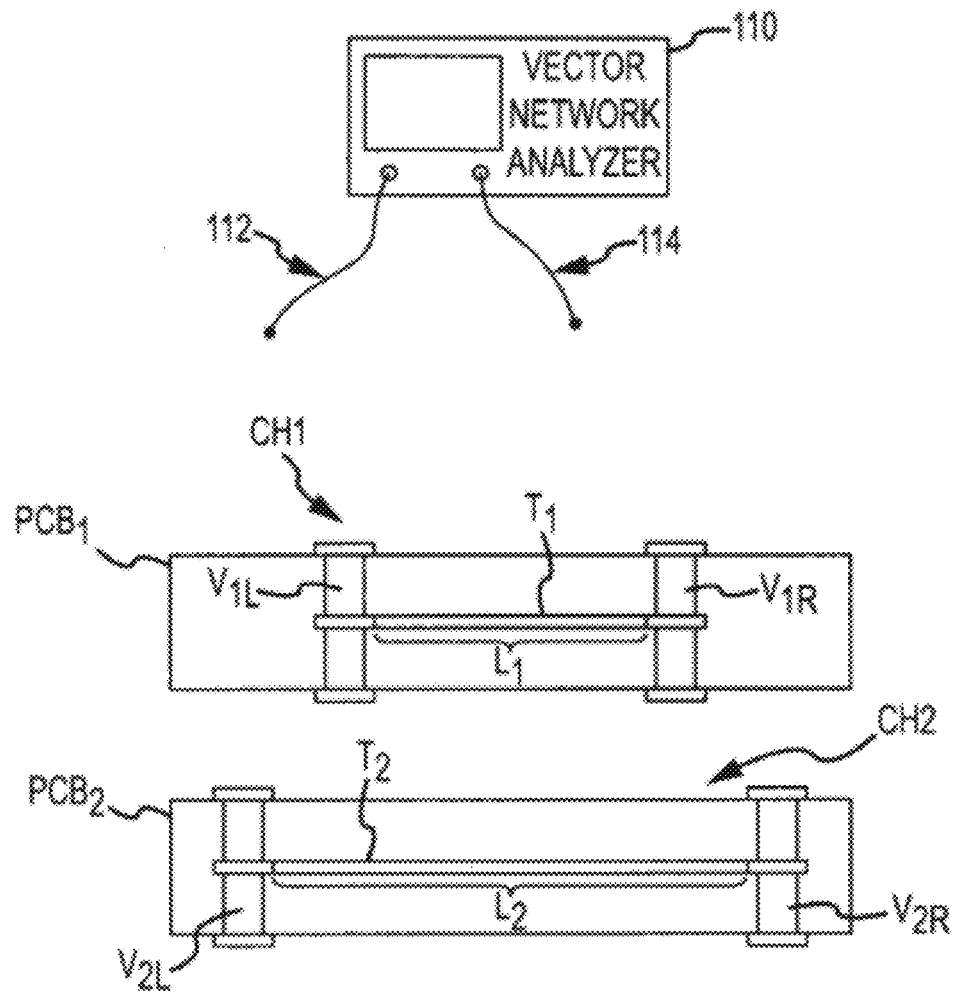
FIG. 1 is a diagram of two PCB channels and a vector network analyzer.

FIG. 1 is a simplified diagram of two PCB channels CH1 and CH2 that may be used to generate component models for vias and traces used in high bandwidth serial link channels. It will be appreciated that models for other components of PCB channels may be generated using the techniques described herein (see FIG. 7). The PCB channel CH1 includes two vias $V_{1L}$ and $V_{1R}$ coupled together by a trace $T_1$ having a length $L_1$. The PCB channel CH1 resides in a multi-layered PCB $PCB_1$. As can be appreciated, the trace $T_1$ may be positioned in one of several layers of the PCB $PCB_1$. Further, other traces, vias, and conductive planes may be included in the PCB $PCB_1$ (e.g., ground planes, traces, and/or vias). Similarly, the PCB channel CH2 includes two vias $V_{2L}$ and $V_{2R}$ coupled together by a trace $T_2$ having a length $L_2$ different from the length $L_1$ of PCB channel CH1. For example, in one embodiment $L_1$ is 4 inches and $L_2$ is 6 inches, but other lengths for $L_1$ and $L_2$ are contemplated. The PCB channel CH2 resides in a multi-layered PCB $PCB_2$. FIG. 1 also illustrates a vector network analyzer (VNA) 110 that may be used to measure characteristics (e.g., s-parameters) of the PCB channels CH1 and CH2 by selectively coupling probes 112, 114 of the VNA 110 to either vias $V_{1L}$ and $V_{1R}$ of PCB channel CH1 or vias $V_{2L}$ and $V_{2R}$ of PCB channel CH2. It should be appreciated that, in practice, PCB channels CH1 and CH2 may be on the same PCB (e.g., to limit differences between the two channels) rather than two separate PCBs as shown in FIG. 1.

Figure 2:
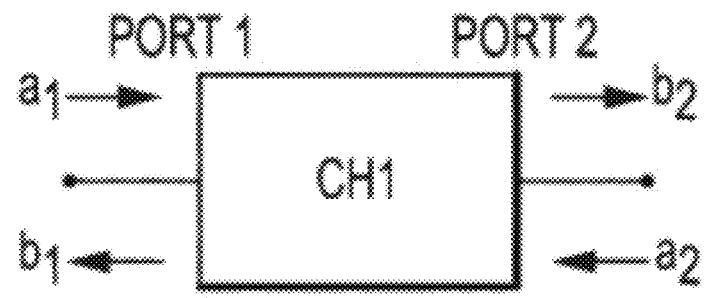
FIG. 2 is a block diagram of a first PCB channel shown in FIG. 1, represented as a two-port network.
Figure 3:
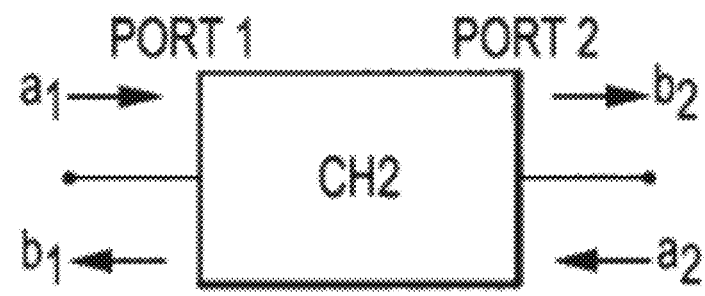
FIG. 3 is a block diagram of a second PCB channel shown in FIG. 1, represented as a two-port network.

FIGS. 2 and 3 illustrate block diagrams of PCB channels CH1 and CH2 (shown in FIG. 1), respectively, represented as two-port networks. As can be appreciated, RF and microwave networks may be characterized using scattering or s-parameters. The s-parameters of a network provide an accurate physical representation of the transmission and reflection performance of the network. Generally, the s-parameters for a two-port network are defined using the reflected (or emanating) waves $b_1$ and $b_2$ as the dependent variables and the incident waves $a_1$ and $a_2$ as the independent variables. The general equations for these waves as a function of the s-parameters are shown below:

$$b_1 = S_{11}a_1 + S_{12}a_2$$

$$b_2 = S_{21}a_1 + S_{22}a_2$$

or, in matrix form:

$$\begin{vmatrix} b_1 \\ b_2 \end{vmatrix} = \begin{vmatrix} S_{11} & S_{12} \\ S_{21} & S_{22} \end{vmatrix} \begin{vmatrix} a_1 \\ a_2 \end{vmatrix}$$

Using these equations, the individual s-parameters $S_{11}$, $S_{12}$, $S_{21}$, and $S_{22}$ for each network may be determined by taking the ratio of the reflected or transmitted wave to the incident wave with perfect termination placed at the output. For example, to determine the reflection parameter for Port 1, defined as $S_{11}$, we can take the ratio of the reflected wave $b_1$ to the incident wave $a_1$, using perfect termination on Port 2. The perfect termination guarantees that $a_2=0$ since there is no reflection from an ideal load. The remaining s-parameters $S_{21}$, $S_{22}$, and $S_{12}$ are defined in a similar manner. These four s-parameters define the characteristics of the two-port networks for PCB channels CH1 and CH2. As noted above, vector network analyzers may be used to accurately measure the s-parameters of a two-port network. Further, since s-parameters may be dependent upon frequency, s-parameters may be measured at a plurality of frequencies to discern the characteristics of a two-port network. For example, the s-parameters for a two-port network may be measured at predetermined frequencies ranging from 0-25 GHz or higher.

Figure 4:
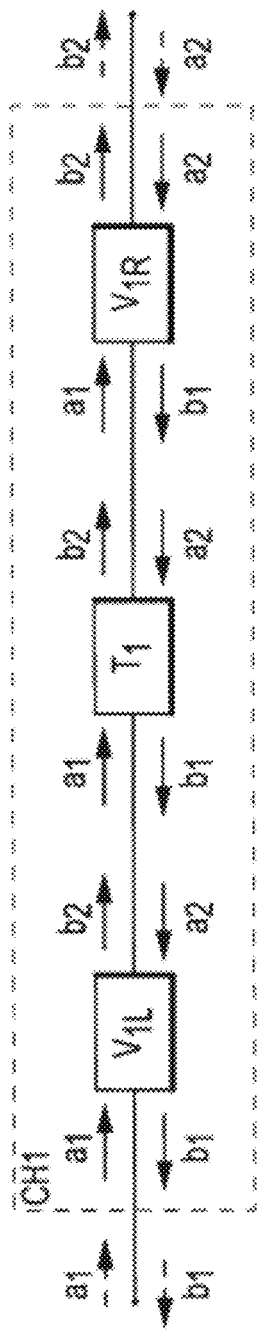
FIG. 4 is a block diagram of the first PCB channel shown in FIG. 1 wherein the components have been represented as separate, cascaded two-port networks.
Figure 5:
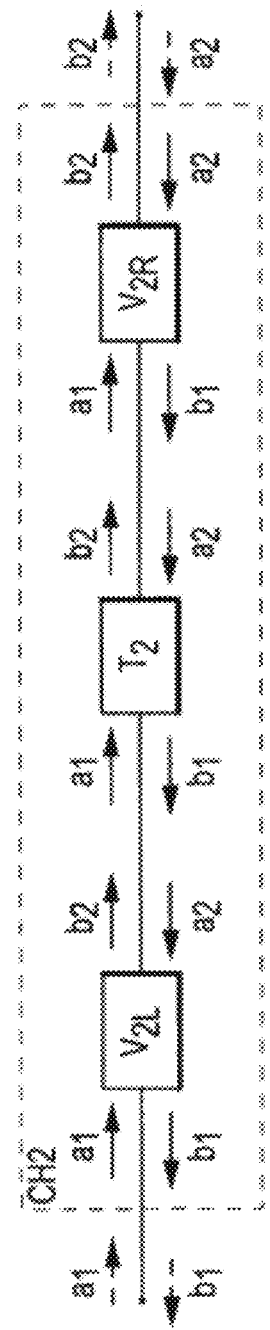
FIG. 5 is a block diagram of the second PCB channel shown in FIG. 1 wherein the components have been represented as separate, cascaded two-port networks.

FIGS. 4 and 5 illustrate block diagrams of PCB channels CH1 and CH2 (shown in FIG. 1), respectively, represented as a series of three, cascaded two-port networks. As shown, the PCB channels CH1 and CH2 have been separated into their individual components. For example, the two-port network for PCB channel CH1 has been separated into a two-port network for the via $V_{1L}$ cascaded with a two-port network for the trace $T_1$, further cascaded with a two-port network for the via $V_{1R}$. Similarly, the two-port network for PCB channel CH2 has been separated into a two-port network for the via $V_{2L}$ cascaded with a two-port network for the trace $T_2$, further cascaded with a two-port network for the via $V_{2R}$.

From FIGS. 4 and 5, it can be seen that the s-parameters for PCB channels CH1 and CH2 may be expressed in terms of their individual components, yielding the s-matrix equations below:

$$S_{CH1} = S_{V1L}(\text{cascade})S_{T1}(\text{cascade})S_{V1R}$$

$$S_{CH2} = S_{V2L}(\text{cascade})S_{T2}(\text{cascade})S_{V2R}$$

where $S_{CH1}$ and $S_{CH2}$ are the s-matrices (i.e., matrices having the elements $S_{11}$, $S_{12}$, $S_{21}$, and $S_{22}$) for the PCB channels CH1 and CH2, respectively; $S_{V1L}$, $S_{V1R}$, $S_{V2L}$ and $S_{V2R}$ are the s-matrices for the vias $V_{1L}$, $V_{1R}$, $V_{2L}$ and $V_{2R}$, respectively; and $S_{T1}$ and $S_{T2}$ are the s-matrices for the traces $T_1$ and $T_2$, respectively; and (cascade) is the mathematical cascade operation of two matrices.

In practice, the cascade operation may be performed by first converting two s-matrices into ABCD-matrices, multiplying the ABCD-matrices together, and then converting the resulting ABCD-matrix back into an s-matrix. Those skilled in the art will readily recognize other methods for performing a cascade operation between two matrices. As noted above, the s-parameters $S_{CH1}$ and $S_{CH2}$ for the PCB channels CH1 and CH2 may be measured using a VNA, but the s-parameters of the components of the PCB channels may not be directly observable.

Since each of the eight s-matrices in the two s-matrix equations shown above includes four s-parameters (i.e., $S_{11}$, $S_{12}$, $S_{21}$, and $S_{22}$ for each s-matrix), and each s-parameter is a complex number, the two s-matrix equations shown above include a total of 64 variables (i.e., eight s-matrices, each having four s-parameters having a magnitude and a phase). However, the inventors have recognized that there are certain properties of the PCB channels CH1 and CH2 that may be used to simplify the two s-matrix equations above so that the s-parameters for the vias $V_{1L}$, $V_{1R}$, $V_{2L}$, $V_{2R}$, and traces $T_1$ and $T_2$ may be accurately determined. The particulars of these properties are provided below.

First, since the PCB channels CH1 and CH2 are symmetrical, the return loss and the insertion loss are the same at Port 1 and Port 2 for each of the PCB channels CH1 and CH2 (i.e., $S_{11} = S_{22}$, and $S_{12} = S_{21}$ for each PCB channel). Therefore, VNA measurements of the two PCB channels CH1 and CH2 having identical composition but different trace lengths provide a total of 8 observable variables (4 complex numbers), namely $S_{11}$ and $S_{12}$ for PCB channel CH1, and $S_{11}$ and $S_{12}$ for PCB channel CH2. This feature is shown below:

$$S_{CH1} = \begin{vmatrix} \alpha & \beta \\ \beta & \alpha \end{vmatrix}$$

$$S_{CH2} = \begin{vmatrix} \chi & \delta \\ \delta & \chi \end{vmatrix}$$

where $\alpha$, $\beta$, $\gamma$, and $\delta$ are distinct complex numbers.

Further, since the vias $V_{1L}$ and $V_{2L}$ are identical, their s-parameters will be equivalent, and may simply be represented as $S_V$. In addition, since the vias $V_{1R}$ and $V_{2R}$ are identical to the vias $V_{1L}$ and $V_{2L}$ but are simply connected to the PCB channels CH1 and CH2 in reverse direction, their s-parameters will also be equal to $S_V$, yielding a single s-matrix $S_V$ for all four of the vias $V_{1L}$, $V_{1R}$, $V_{2L}$, and $V_{2R}$. Additionally, since the vias form reciprocal two-port networks (i.e., $S_{12} = S_{21}$ in the via s-matrix $S_V$), the via s-matrix $S_V$ has 6 unknowns (3 complex numbers) from the three distinct s-parameters $S_{11}$, $S_{22}$, and $S_{12}$ (or $S_{21}$). This feature is shown below:

$$S_V = \begin{vmatrix} \varepsilon & \varphi \\ \varphi & \gamma \end{vmatrix}$$

where $\varepsilon$, $\phi$, and $\gamma$ are distinct complex numbers.

In addition to the above-noted properties of the PCB channels CH1 and CH2, the s-matrices $S_{T1}$ and $S_{T2}$ for the traces $T_1$ and $T_2$, respectively, have only 2 unknown variables (one complex number) since a transmission line may be fully specified by its insertion loss s-parameters $S_{12}$ and $S_{21}$, which are equivalent to each other. The characteristic impedance ($Z_0$) of the traces $T_1$ and $T_2$ is considered to be known as it may be determined by inspecting the low frequency return loss with renormalized port impedance. Further, using the known relationship between the lengths $L_1$ and $L_2$ of the traces $T_1$ and $T_2$, respectively, the insertion loss $S_{12}$ and $S_{21}$ of the trace $T_2$ may be scaled linearly by the ratio of the trace lengths $L_1$ and $L_2$. This feature is shown below:

$$S_{T1} = \begin{vmatrix} 0 & \exp(\eta) \\ \exp(\eta) & 0 \end{vmatrix}$$

$$S_{T2} = \begin{vmatrix} 0 & \exp(c_1 \eta) \\ \exp(c_1 \eta) & 0 \end{vmatrix}$$

where $\eta$ is a distinct complex number, and wherein $c_1$ represents a scalar to compensate for the difference in the trace lengths $L_1$ and $L_2$.

After utilizing the above-noted properties of the PCB channels CH1 and CH2, the s-matrix equations may be expressed as two 2×2 matrix equations having eight measurable variables (i.e., complex variables $\alpha$, $\beta$, $\chi$, and $\delta$) and eight unknown variables (i.e., complex variables $\varepsilon$, $\gamma$, $\phi$, and $\eta$). This feature is shown below:

$$S_{CH1} = S_{V1L}(\text{cascade})S_{T1}(\text{cascade})S_{V1R}$$

or $$\begin{vmatrix} \alpha & \beta \\ \beta & \alpha \end{vmatrix} = \begin{vmatrix} \varepsilon & \varphi \\ \varphi & \gamma \end{vmatrix}(\text{cascade})\begin{vmatrix} 0 & \exp(\eta) \\ \exp(\eta) & 0 \end{vmatrix}(\text{cascade})\begin{vmatrix} \gamma & \varphi \\ \varphi & \varepsilon \end{vmatrix}$$

and $$S_{CH2} = S_{V2L}(\text{cascade})S_{T2}(\text{cascade})S_{V2R}$$

or $$\begin{vmatrix} \chi & \delta \\ \delta & \chi \end{vmatrix} = \begin{vmatrix} \varepsilon & \varphi \\ \varphi & \gamma \end{vmatrix}(\text{cascade})\begin{vmatrix} 0 & \exp(c_1 \eta) \\ \exp(c_1 \eta) & 0 \end{vmatrix}(\text{cascade})\begin{vmatrix} \gamma & \varphi \\ \varphi & \varepsilon \end{vmatrix}$$

As can be appreciated, these s-matrix equations may be solved for the unknown variables using any suitable method. In one embodiment, the s-parameters of the vias and traces of the PCB channels CH1, CH2 are determined by solving the above equations using a stochastic optimization method to find the solution in 8-dimensional parameter space. In this example, the objective function F for the optimization is given below:

$$F = \text{norm}(S_{CH1\_M} - S_{CH1}) + \text{norm}(S_{CH2\_M} - S_{CH2})$$

where $S_{CH1\_M}$ and $S_{CH2\_M}$ are the measured s-parameters of PCB channels CH1 and CH2, respectively; and $S_{CH1}$ and $S_{CH2}$ are estimates (or guesses) of the s-parameters for the PCB channels CH1 and CH2, respectively. Further, the "norm" function determines the magnitude of the vector that is composed of the elements of the matrix passed to the norm function.

Therefore, each of the two terms in the objective function represents errors in the estimates for the s-parameters of PCB channels CH1 and CH2. As can be appreciated, the global minimum of the objective function (i.e., minimum error) coincides with the solution of the s-parameters for the vias and traces of the PCB channels. To determine the global minimum of the objective function, an iterative process such as a steepest descent minimization algorithm may be employed. As an example, the software package MATLAB™ produced by The Mathworks, Inc. includes a steepest descent minimization sub-module that may be used to determine the global minimum of the objective function.

As can be appreciated, the minimization process may undesirably determine local minima of the objective function, rather than the desired global minimum. To remedy this, stochastic initialization of the s-parameters of the vias and traces may be applied with repetition in order to discard local minima by selecting a smaller objective function in an iterative search for the global minimum.

Figure 6:
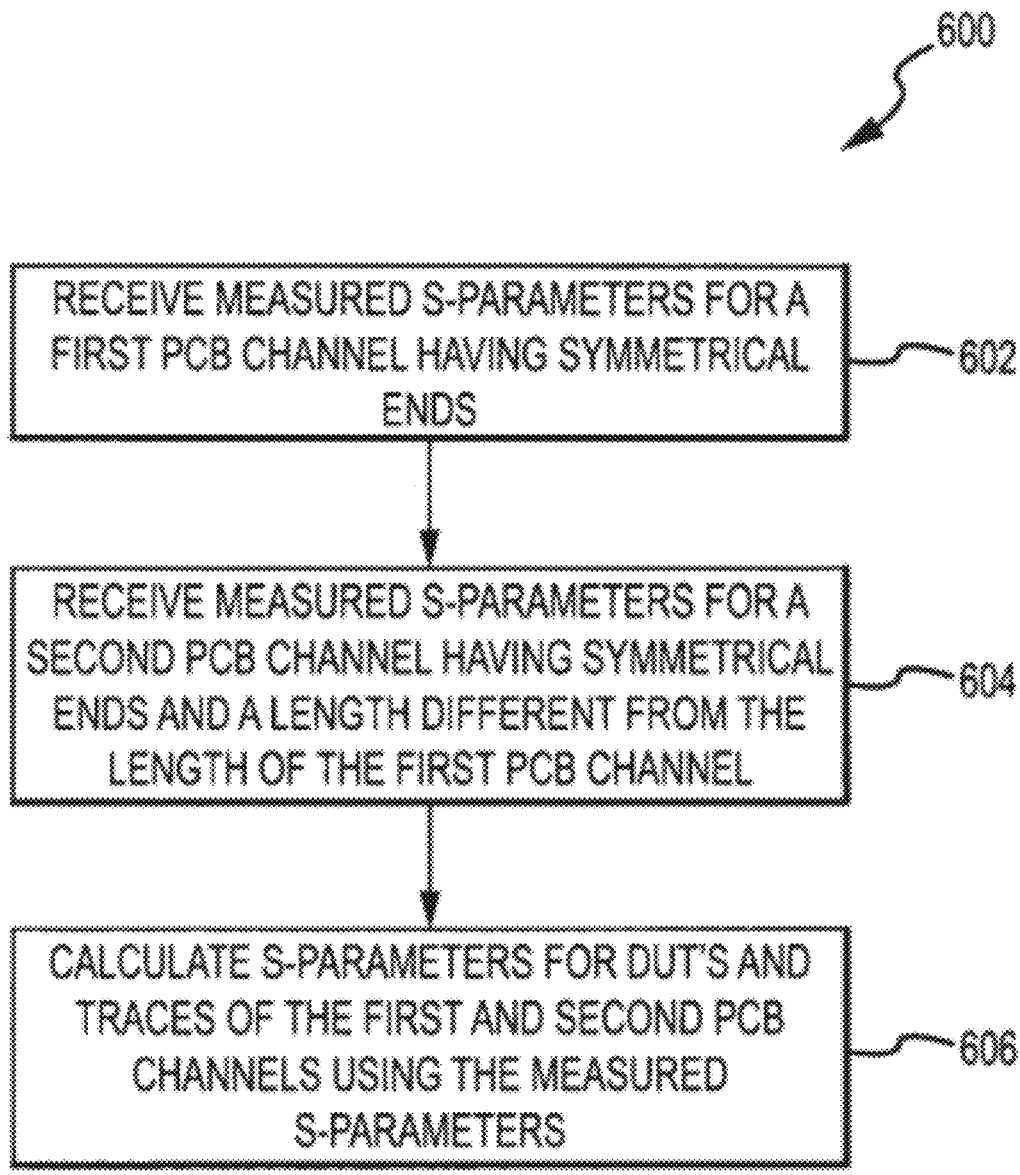
FIG. 6 is a flow chart of an exemplary process for determining s-parameters of components of a PCB channel.

FIG. 6 is a flow chart of a process 600 for accurately determining the s-parameters for components (or devices under test (DUTs)) of a PCB channel, such as the PCB channels CH1 and CH2 shown in FIG. 1. The process 600 may be implemented by a computer system, such as the computer system 810 shown in FIG. 8 and described below. The process 600 starts by receiving measured s-parameters for first and second symmetrical PCB channels that are substantially identical to each other except that they have differing PCB trace lengths (steps 602 and 604). For example, the s-parameters may be measured using a vector network analyzer and input manually or automatically into the computer system.

Next, the process 600 may include calculating the s-parameters for the DUTs of the PCB channels using the measured s-parameters (step 606). For example, the s-parameters for the components of the PCB channels may be calculated as describe above. That is, s-matrices for the PCB channels may be equated with cascaded s-matrices for the components associated with the PCB channels. Then, a method may be used to accurately determine the s-parameters for the components of the PCB channels. Further, as noted above, the calculated s-parameters may be used to generate models of the components to be used with one or more EDA tools.

It should be appreciated that, although the example provided above in FIGS. 1-5 describes the method for determining an EDA model for a via that is part of a single-ended PCB channel, the techniques described herein may also be used to develop differential via models (more generally, DUT models) as well. In this regard, a four-port, mixed mode s-matrix may be decomposed into both differential and common mode two-port sub-matrices, which become independent of each other when the mode conversion is relatively small. In addition, the method described herein may also be applied to de-embed a coaxial launcher on a test fixture in place of a via, thereby providing an improvement on existing de-embedding procedures.

Figure 7:
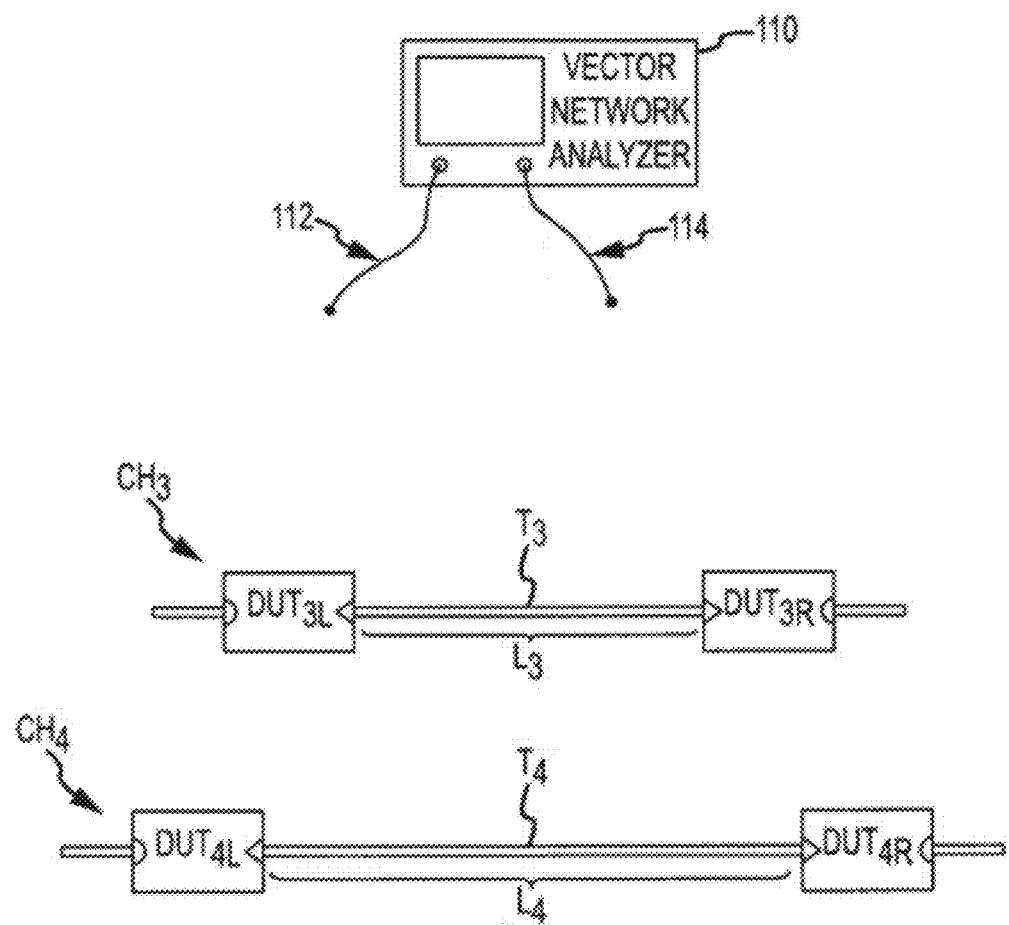
FIG. 7 is another diagram of two PCB channels and a vector network analyzer.

FIG. 7 illustrates a test setup for developing a model for a component of a PCB channel, represented generically as a DUT. It will be appreciated that the DUT may include one or more structures present in the PCB channel. In general, the components of FIG. 7 are similar to the components of FIG. 1, except that FIG. 7 involves creating a model for any component of a PCB, whereas the embodiment shown in FIG. 1 involves generating a model specifically for vias of a PCB channel.

The test setup shown in FIG. 7 includes two symmetric PCB channels CH3 and CH4 that may be used to generate component models for devices used in high bandwidth serial link channels. The PCB channel CH3 includes two DUTs $DUT_{3L}$ and $DUT_{3R}$ coupled together by a trace $T_3$ having a length $L_3$. The PCB channel CH3 may reside in a multi-layered PCB. As can be appreciated, the trace $T_3$ may be positioned in one of several layers of the PCB. Further, other traces, vias, and conductive planes may be included in the PCB (e.g., ground planes, traces, and/or vias). Similarly, the PCB channel CH4 includes two DUTs $DUT_{4L}$ and $DUT_{4R}$ coupled together by a trace $T_4$ having a length $L_4$ different from the length $L_3$ of PCB channel CH3. For example, in one embodiment $L_3$ is 4 inches and $L_4$ is 6 inches, but other lengths for $L_3$ and $L_4$ are contemplated. The PCB channel CH3 may reside in a multi-layered PCB. The DUTs $DUT_{3L}$, $DUT_{3R}$, $DUT_{4L}$, and $DUT_{4R}$ are substantially identical, such that the PCB channels CH3 and CH4 are symmetrical and differ only in their trace lengths $L_3$ and $L_4$, respectively. As can be appreciated, by using the techniques described above with reference to FIGS. 1-6, the s-parameters for the DUTs and traces of the PCB channels CH3 and CH4 may be determined and EDA models may be developed.

Figure 8:
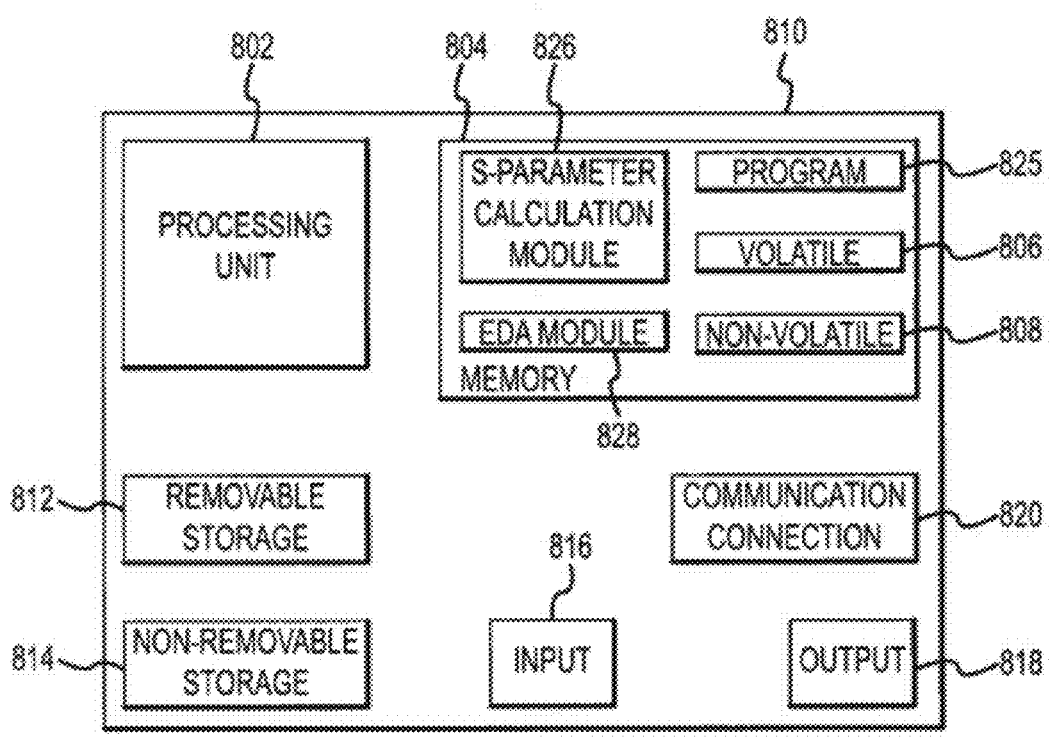
FIG. 8 is a block diagram of a computer system according to an exemplary embodiment.

FIG. 8 is a block diagram of a computer system 810 that may be used to implement the functionality described above. In one embodiment, multiple such computer systems 810 may be utilized in a distributed network (e.g., one system for determining via models, and another for executing EDA tools). The example computer system 810 in the form of a computer may include a processing unit 802, memory 804, removable storage 812, and non-removable storage 814. Memory 804 may include volatile memory 806 and non-volatile memory 808. The computer system 810 may include, or have access to a computing environment that includes, a variety of computer-readable media, such as volatile memory 806 and non-volatile memory 808, removable storage 812 and non-removable storage 814. Computer storage may include random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. The computer system 810 may include, or have access to a computing environment that includes, input 816, output 818, and a communication connection 820. The input 816 may include one or more input devices such as a mouse, a keyboard, electronic pen type input, an audio input device such as a microphone coupled to an audio card or other dedicated audio circuit, a web cam, a screen capture program or device, or other input device. The output 818 may include a video monitor, speakers coupled to the audio card or other dedicated audio circuit, a printing device, or other output device.

The computer system 810 may operate in a networked environment using the communication connection 820 to connect to one or more remote computers, such as one or more servers or other remote computers. The remote computers may include one or more of a personal computer ("PC"), notebook computer, consumer electronic device (e.g., camera, camcorder, set top box, mobile device, and the like), server, router, network PC, a peer device, or other common network node, and the like. The communication connection 820 may include a Local Area Network ("LAN"), a Wide Area Network ("WAN"), the Internet, a Virtual Private Network ("VPN"), a peer-to-peer network, or other networks.

Computer-readable instructions stored on a computer-readable medium may be executable by the processing unit 802 of the computer system 810. A hard drive, CD-ROM, and RAM are some examples of articles including a computer-readable medium. For example, one or more computer programs (or application) 825 may be stored in the memory 804. The memory 804 may also store an s-parameter calculation module 826 that is operative to receive measured s-parameters from two PCB channels having different lengths and to accurately determine s-parameters for the components of PCB channels using the methods described above. Further, the memory 804 may store an EDA module 828, which may be operative to receive the calculated s-parameters from the s-parameter calculation module and to generate EDA models of the components to be used by designers. As can be appreciated, the EDA module 828 may be executed on the computer system 810 or may reside on a wholly separate computer system.

While this specification contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

We claim:

1. A computer-implemented method for determining s-parameters of components in a printed circuit board (PCB) channel, comprising:

receiving, using a computer, measured s-parameters for a first PCB channel, the first PCB channel including a first trace having a component coupled to each end, the components being substantially identical to each other such that the first PCB channel is symmetrical about the center of the first trace;

receiving, using the computer, measured s-parameters for a second PCB channel, the second PCB channel including a second trace having a component coupled to each end, the components being substantially identical to each other and to the components of the first PCB channel such that the second PCB channel is symmetrical about the center of the second trace, wherein the first trace has a length differing from a length of the second trace; and determining, using the computer, calculated s-parameters for the first trace, the second trace, and the components using the measured s-parameters for the first and second PCB channels by applying stochastic optimization to the measured s-parameters for the first and second PCB channels to determine s-matrices of the components by searching a multi-dimensional parameter space.

2. The method of claim 1, further comprising:

generating, using the computer, a model of at least one of the first trace, the second trace, and the components using the calculated s-parameters.

3. The method of claim 1, wherein the measured s-parameters for the first PCB channel and the second PCB channel are received from a vector network analyzer (VNA) and include s-parameters measured over a plurality of frequencies.

4. The method of claim 1, wherein measured s-parameters for the first PCB channel and the second PCB channel include s-parameters measured at a predetermined plurality of frequencies, and wherein the calculated s-parameters include calculating s-parameters at the predetermined plurality of frequencies for the first trace, the second trace, and the components using the measured s-parameters for the first and second PCB channels.

5. The method of claim 1, wherein determining the calculated s-parameters comprises:

generating a first s-matrix equation that equates an s-matrix of the first PCB channel with s-matrices of the first trace and the components cascaded together;

generating a second s-matrix equation that equates an s-matrix of the second PCB channel with s-matrices of the second trace and the components cascaded together; and solving the first and second s-matrix equations for the s-parameters of the first trace, the second trace, and the components using the measured s-parameters for the first and second PCB channels.

6. The method of claim 5, wherein the solving step comprises converting the s-matrices in the first and second s-matrix equations into ABCD-matrices.

7. The method of claim 5, wherein the solving step comprises solving the first and second s-matrix equations using an iterative method.

8. The method of claim 7, wherein the components of the first PCB channel and the second PCB channel include vias.

9. A computer system, comprising:

a processor; and a data storage coupled to the processor, the data storage storing an s-parameter calculation module that is operative to be executed by the processor to:

receive measured s-parameters for a first PCB channel at a predetermined plurality of frequencies, the first PCB channel including a first trace having a component coupled to each end, the components being substantially identical to each other such that the first PCB channel is symmetrical about the center of the first trace;

receive measured s-parameters for a second PCB channel at the predetermined plurality of frequencies, the second PCB channel including a second trace having a component coupled to each end, the components being substantially identical to each other and to the components of the first PCB channel such that the second PCB channel is symmetrical about the center of the second trace, wherein the first trace has a length differing from a length of the second trace; and calculate s-parameters for the first trace, the second trace, and the components at the predetermined plurality of frequencies using the measured s-parameters for the first and second PCB channels by applying stochastic optimization to the measured s-parameters for the first and second PCB channels to determine s-matrices of the components by searching a multi-dimensional parameter space.

10. The computer system of claim 9, wherein the data storage further stores a circuit modeling module operative to generate a model of at least one of the first trace, the second trace, and the components using the calculated s-parameters.

11. The computer system of claim 9, wherein the measured s-parameters for the first PCB channel and the second PCB channel are received by the computer system from a vector network analyzer (VNA).

12. The computer system of claim 9, wherein the s-parameter calculation module, when executed by the processor, is operative to:
generate a first s-matrix equation that equates an s-matrix of the first PCB channel with s-matrices of the first trace and the components cascaded together;
generate a second s-matrix equation that equates an s-matrix of the second PCB channel with s-matrices of the second trace and the components cascaded together; and
solve the first and second s-matrix equations for the s-parameters of the first trace, the second trace, and the components using the measured s-parameters for the first and second PCB channels.

13. The computer system of claim 9, wherein the s-parameter calculation module, when executed by the processor, is operative to convert the s-matrices in the first and second s-matrix equations into ABCD-matrices to solve the first and second s-matrix equations.

14. The computer system of claim 9, wherein the components of the first PCB channel and the second PCB channel include vias.

15. A nontransitory computer readable medium containing computer instructions stored therein for causing a computer processor to:

receive measured s-parameters for a first symmetrical PCB channel comprising at least two components at a predetermined plurality of frequencies;
receive measured s-parameters for a second symmetrical PCB channel comprising at least two components at the predetermined plurality of frequencies, the second symmetric PCB channel having a length different than a length of the first symmetric PCB channel; and
calculate s-parameters for the plurality of components of the first symmetric PCB channel and the second symmetric PCB channel at the predetermined plurality of frequencies using the measured s-parameters for the first and second symmetrical PCB channels by applying stochastic optimization to the measured s-parameters for the first and second PCB channels to determine s-matrices of the components by searching a multi-dimensional parameter space.

16. The nontransitory computer readable medium of claim 15, further comprising instructions which when processed by a computer, cause the computer to:
generate a first s-matrix equation that equates an s-matrix of the first symmetrical PCB channel with s-matrices of the components of the first symmetrical PCB channel cascaded together;
generate a second s-matrix equation that equates an s-matrix of the second PCB channel with s-matrices of the components of the second symmetrical PCB channel cascaded together; and
solve the first and second s-matrix equations for the s-parameters of the components of the first and second symmetrical PCB channels using the measured s-parameters for the first and second symmetrical PCB channels.

17. The nontransitory computer readable medium of claim 15, further comprising instructions which when processed by a computer, cause the computer to solve the first and second s-matrix equations using a steepest descent minimization function.

* * * * *